(12) United States Patent
Thompson et al.

(10) Patent No.: US 9,104,572 B1
(45) Date of Patent: Aug. 11, 2015

(54) AUTOMATED ROOT CAUSE ANALYSIS

(71) Applicant: Amazon Technologies, Inc., Reno, NV (US)

(72) Inventors: James Michael Thompson, Seattle, WA (US); Marc Stephen Olson, Bellevue, WA (US); Ganesh Viswanathan, Seattle, WA (US); Benjamin Arthur Hawks, Seattle, WA (US); Bhavesh Anil Doshi, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 13/764,691

(22) Filed: Feb. 11, 2013

(51) Int. Cl.
*G06F 11/00* (2006.01)
*G06F 11/07* (2006.01)
*G06F 11/30* (2006.01)

(52) U.S. Cl.
CPC .......... *G06F 11/079* (2013.01); *G06F 11/3034* (2013.01)

(58) Field of Classification Search
CPC .. G06F 11/008; G06F 11/079; G06F 11/3034
USPC ................................. 714/47.3, 26
See application file for complete search history.

(56) References Cited

U.S. PATENT DOCUMENTS

| | | | | |
|---|---|---|---|---|
| 7,917,810 B2* | 3/2011 | Piszczek et al. | | 714/43 |
| 8,122,294 B2* | 2/2012 | Childs et al. | | 714/42 |
| 8,467,281 B1* | 6/2013 | Colon et al. | | 369/59.22 |
| 8,832,498 B1* | 9/2014 | Jain et al. | | 714/26 |
| 2006/0195728 A1* | 8/2006 | Lin et al. | | 714/42 |
| 2008/0115014 A1* | 5/2008 | Vaidyanathan et al. | | 714/42 |
| 2008/0250042 A1* | 10/2008 | Mopur et al. | | 707/100 |
| 2011/0314332 A1* | 12/2011 | Shimada et al. | | 714/26 |
| 2012/0254406 A1* | 10/2012 | Nagai et al. | | 709/224 |
| 2013/0138808 A1* | 5/2013 | Biller | | 709/224 |
| 2013/0205173 A1* | 8/2013 | Yoneda | | 714/47.2 |

OTHER PUBLICATIONS

Heckerman, D., Probabilistic Similarity Networks. [online]. The MIT Press, 1991 [retrieved on Mar. 28, 2013]. Retrieved from the Internet: <URL: http://research.microsoft.com/en-us/um/people/heckerman/H91book.pdf>, 263 pages.

Moore, A., Bayesian Networks Tutorial Slides. [online]. Carnegie Mellon University, 2001 [retrieved on Mar. 28, 2013]. Retrieved from the Internet: <URL: http://www.autonlab.org/tutorials/bayesnet09.pdf>.

Koller, D. and Nir Friedman, *Probabilistic Graphical Models: Principles and Techniques*. Cambridge, Massachusetts, The MIT Press, 2009.

(Continued)

*Primary Examiner* — Yolanda L Wilson
(74) *Attorney, Agent, or Firm* — Kilpatrick Townsend & Stockton LLP

(57) ABSTRACT

Various aspects of the performance of computing resources, such as storage volumes, are measured and used to train a probability model. The probability model is used in a query engine that is able to respond receive queries about a computing resource's state. The queries may specify a state of the computing resource and provide a set of measurements of the computing resource's performance. The query engine may use the probability model, which may be in the form of a contingency table, to provide information that indicates one or more most likely causes of the state.

25 Claims, 10 Drawing Sheets

(56) References Cited

OTHER PUBLICATIONS

Koller, D., Towards Optimal Feature Selection. [online]. Stanford University, 1996 [retrieved on Mar. 28, 2013]. Retrieved form the Internet: <URL: http://ilpubs.stanford.edu:8090/208/1/1996-77.pdf>.

Hastie, T., The Elements of Statistical Learning, [online]. Stanford University, 2009 [retrieved on Mar. 28, 2013] Retrieved from the Internet: <URL: http://www.stanford.edu/~hastie/local.ftp/Springer/OLD/ESLII_print4.pdf>.

Naïve Bayes classifier. [online]. Wikipedia, No Date Given [retrieved on Mar. 28, 2013]. Retrieved from the Internet: <URL: http://en.wikipedia.org/wiki/Naive_bayes_classifier>.

Maximum a posteriori estimation. [online]. Wikipedia, No Date Given [retrieved on Mar. 28, 2013]. Retrieved from the Internet: <URL: http://en.wikipedia.org/wiki/Maximum_a_posteriori_estimation>.

Unsupervised learning. [online]. Wikipedia, No Date Given [retrieved on Mar. 28, 2013]. Retrieved from the Internet: <URL: http://en.wikipedia.org/wiki/Unsupervised_learning>.

\* cited by examiner

| Health State | Measured Performance Relative to Desired Performance |
|---|---|
| Healthy | Above 90% |
| Degraded | 50%-90% |
| Severely Degraded | 0%-50% |
| Inoperable | 0% | ial # AUTOMATED ROOT CAUSE ANALYSIS

BACKGROUND

Modern computer systems are often made of multiple components that work collectively, each playing a role in a system's overall operation. The components may include servers, data storage devices, networking devices, software components and other pieces of hardware and/or software that enable the system to operate. These components may be distributed throughout a data center and/or even throughout multiple data centers. The transfer of information from one component to the other can involve the participation of multiple other components. For instance, an electronic communication from a client to a server may pass from one programming module to another within a computer system, over a network and/or from one programming module to another on another computer system. While on the network, the electronic communication may pass through numerous components on the network, such as firewalls, routers, switches and/or other networking devices.

In many contexts, computing devices often send and receive numerous communications to and from other computing devices over various time periods. An application on a server may, for instance, send numerous input/output operation requests to a data storage device located in a different location on a network. The application's effective operation may require effective communication with the data storage device. At the same time, a degradation in performance by a device participating in the communications may cause the effectiveness of the communications to decrease or cause the communications to cease. A malfunctioning router, for example, may cause a decrease or halt to the ability of a computer system to communicate with a data storage device. Diagnosing and repairing such problems can be very difficult given the complexities of the various devices involved.

BRIEF DESCRIPTION OF THE DRAWINGS

Various embodiments in accordance with the present disclosure will be described with reference to the drawings, in which.

DETAILED DESCRIPTION

Figure 1:
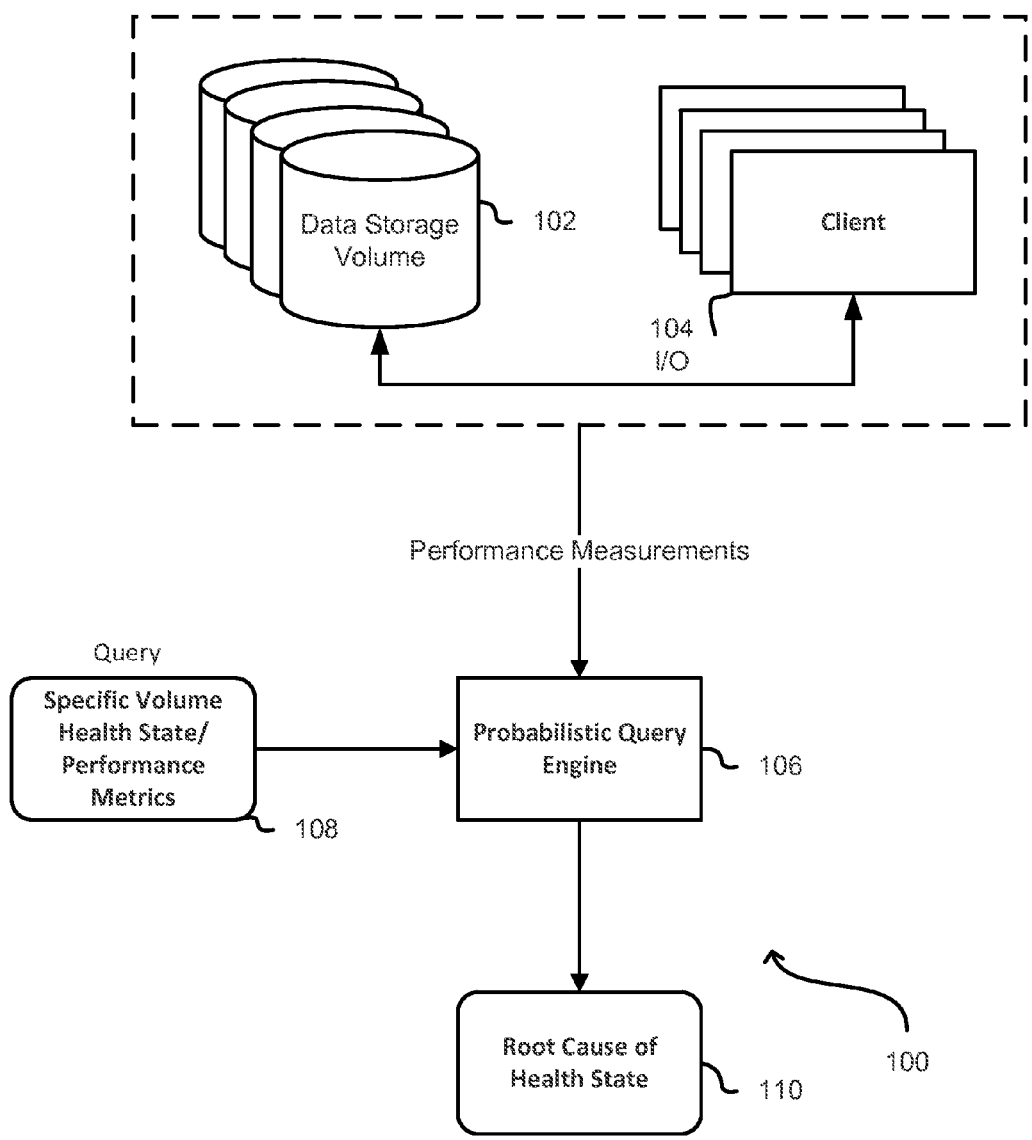
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments of the present disclosure relate to the diagnosis of issues for computing resources. In some examples, the computing resources are storage volumes in a distributed computing environment, although the techniques described and suggested herein may be modified to be used in connection with computing resources of different types. The issues may relate to the ability of computer system instances to communicate with the storage volumes to perform input/output operations per second (IOPS). In many environments, IOPS are complex processes involving numerous sub-processes (sub-operations), including the transmission of communications within a physical computing device, the transmission of communications over a network, and the performance of other operations, such as read and/or write operations on a data storage medium. As a result, a decreased ability to perform IOPS may have multiple possible causes, rendering diagnosis of the decreased ability a complex task.

To improve the ability to diagnose issues relating to the operation of computing resources, embodiments of the present disclosure include measuring the various processes involved in the operation of the computing resources. With the example of storage volumes, various communication latencies and operational latencies may be measured and the measurements may be collected. In addition, data regarding the overall performance of a computing resource may also be collected. For example, IOPS may involve numerous individual communications between devices on a network and other operations, such as transmitting requests to perform IOPS from a data storage client to a data storage server, performing the requested operations, and transmitting acknowledgments of the requested operations having been performed. The time it takes to transmit a request, perform the requested operation and receive the acknowledgment can be measured as an overall indication of the ability to perform IOPS. This measurement may be taken numerous times over a time period and be normalized, averaged, and/or otherwise statistically processed.

Measurements of the overall performance of a computing resource can be used to determine a health state of the computing resource. The health state may be a state from a finite set of predetermined health states, each corresponding to a level of operational ability. For example, the health states available for a computing resource may be: healthy, degraded, severely degraded, or inoperable. In some embodiments, however, the health of a computing resource may be determined in other ways. For example, the health state may be a value on a continuum of health states, expressed for example as a percentage of expected performance.

In various embodiments, the measurements that are taken and collected are used to train a probability model of the computing resource's operation. The probability model may manifest itself in various ways, such as a contingency table that is usable to determine the probability that a computing resource is in a particular health state given a particular measurement being within a particular range. For example, the contingency table may indicate that there is a 10% probability that a storage volume is in a degraded state given that a first latency value is between 8 and 10 milliseconds, but that there is a 50% probability that the storage volume is in a degraded state given that a second latency value is between 8 and 10 milliseconds. The first and second latency values may be related to different parts of a network and/or different operations involved in IOPS, and their association with the degraded state is defined either from simulations, benchmarks with failure mode injection, or from historical data on the service. In this manner, the probability model can be used to determine more likely causes of performance degradations. For instance, referring to the specific example in this paragraph, if the storage volume is in a degraded state with the first latency value and the second latency value both between 8 and 10 milliseconds, it is more likely to be beneficial to investigate potential causes of the second latency value being in the range given the judgment implied by the probability model.

Various embodiments of the present disclosure also allow the use of probability models in convenient diagnostic tools. For instance, in some embodiments, a probability model is used in a query engine that allows technicians and/or automated processes to submit queries to determine potential causes of performance degradations. The queries may specify, for example, a health state for a computing resource and measurements that have been taken regarding the computing resource's operation. The query engine may use the information specified by a query to determine a response that guides diagnosis of the performance degradation and/or its repair. The query engine may, for example, provide a ranked list of potential causes where the ranking is based at least in part on the probability model. The ranked list may have the causes themselves or information indicative of the causes, such as the measurements corresponding to the causes and the probability that the given measurements are associated with the given degradation. In this manner, the query response can be used to address the most likely causes of the performance degradation before addressing others that are less likely to be the cause.

FIG. 1 shows an illustrative example of an environment 100 that may be used to implement various embodiments of the present disclosure. As illustrated, the environment 100 includes a plurality of data storage volumes 102 which are accessed by corresponding clients 104. The data storage volumes 102 and clients 104 may be a particular type of computing resource of various computing resources provided by computing resource provider. The data storage volumes 102 may, for example, be of the same type due to implementation of the same architecture. The computing resource provider may provide infrastructure as a service (IaaS) services to various entities. For example, in some embodiments, the computing resource provider hosts, in its own data center or data centers, hardware that is remotely and programmatically managed by customers of the computing resource provider. The customers may utilize the services to build networks used in support of their operations, where some or all of the networks are implemented using hardware as a computing resource provider. While various aspects of the present disclosure are described in connection with a computing resource provider, it should be noted that the techniques described and suggested herein are usable in other contexts, such as where an organization hosts its own hardware or operates on a mixture of self-hosted and externally hosted devices.

In an embodiment, the data storage volumes 102 are block level storage devices which may be physically attached block level data storage devices (e.g., drives with spinning magnetic media or solid state drives) or may be virtual block level data storage devices, or a combination of the two. A virtual block level storage volume may be implemented in various ways. For example, the underlying data comprising the block level storage volume may be physically stored on multiple data storage devices even though the block level storage volume may be logically represented as a single device. The data storage volumes may be used in various ways. For example, customers of a computing resource provider may format the data storage devices with a file system and mount the file system. Data storage volumes may be physically and/or logically attached to a physical or virtual computer system.

In an embodiment, the clients are implemented using computer systems hosted by the computing resource provider. The clients 104 may be applications of computer systems hosted by the computing resource provider. The client may be an application executing on a computer system such that other applications, such as operating system, are able to communicate with a corresponding data storage volume for the purpose of data storage. The client may be configured such that from the point of view of the operating system, the operating system communicates with the client as if it is communicating with a locally attached broad data storage device.

In an embodiment, clients are separated from corresponding data storage volumes by a network, which is not illustrated explicitly in the figure. Accordingly, also not illustrated, data storage volumes may be implemented using one or more data storage servers. As data flows between clients and data storage volumes, an overall system implementing the clients and data storage volumes may measure various aspects of the communications between the clients and the data storage volume. Such measurements are described in more detail below, but generally in an embodiment, measurements that are relevant to the ability of a client to communicate with its corresponding data storage volumes and also the rates of individual communication steps are collected. Such performance measurements, including health states of storage volumes during which the measurements were taken, may be collected and used to configure a probabilistic query engine 106. The probabilistic query engine may be a computer system or programming module of a computer system configured to receive and respond to queries, such as described in more detail below. As illustrated in FIG. 1, a query 108 to the probabilistic query engine may relate to a particular data storage volume and may include information identifying a health state of the volume and one or more performance metrics measured for the volume. In various embodiments, the query may be submitted by different entities. For example a technician may submit the query using a computer system operated by the technician. As another example, an automated process of a computer system may cause the computer system to transmit the query.

The probabilistic query engine 106 may then process the query 108 and provide a potential root cause 110 (or multiple potential root causes) of the health state identified in the query 108. The probabilistic query engine may determine the root cause in a probabilistic way based, at least in apart, on performance measurements that have been used to configure the probabilistic query engine 106. For example, in an embodiment, the probabilistic query engine 106 uses a probability model to determine which potential root causes are more likely than others for particular health states. The probability model may be encoded by the probabilistic query engine in various ways. For instance, in some embodiments, the probability model is encoded using one or more contingency tables that associate health states with probabilities of certain performance measurements having values in predetermined ranges. Alternative embodiments use more sophisticated probability models (e.g. Gaussian models or Logistic models) describing the probability of degraded performance given one or more values of the given metrics. In this manner, because measurements are tied to computing resources being measured, more likely root causes may be identified using the probability model. The probability model may be generated using measurements over a past time period for a fleet of computing resources, e.g., a fleet of storage volumes, or from simulation data.

Figure 2:
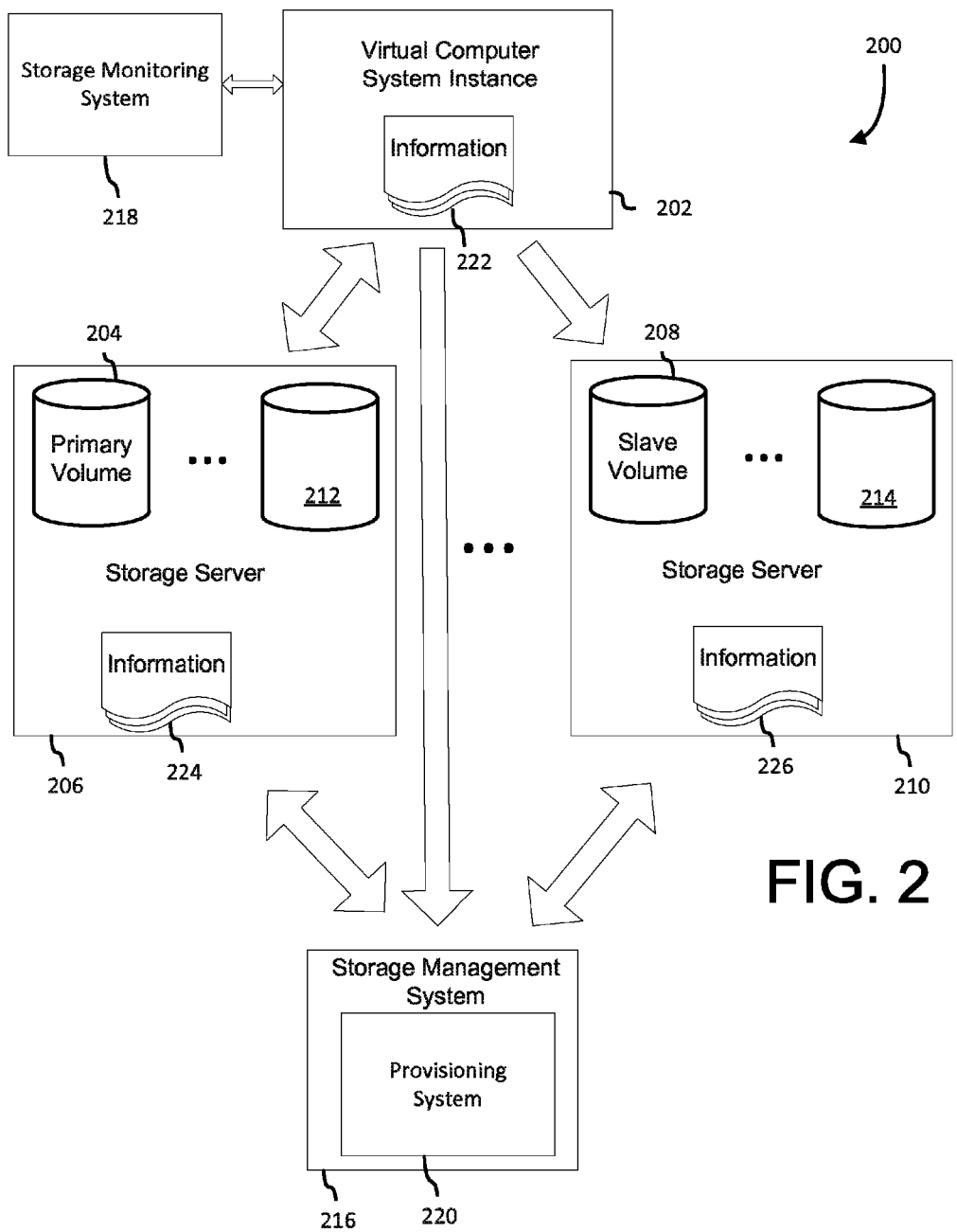
FIG. 2 shows an illustrative example of a data storage environment in which various embodiments can be implemented.

Turning now to FIG. 2, an example embodiment of a data storage system environment 200 is shown. A virtual computer system instance 202 is attached to a primary volume 204 in a first storage server 206. The virtual computer system instance 202, or virtual machine, may read and write data to the primary volume 204. As information is written to the primary volume 204, the written information may be sent to a slave volume 208 in a second storage server 210. By storing the written information of the primary volume 204, the slave volume 208 may provide redundancy for the primary volume. The ellipsis between the primary volume 204 and other volume 212 indicates that the first storage server may support any suitable number of volumes. The ellipsis between the slave volume 208 and other volume 214 indicates that the second storage server may support any suitable number of volumes. The ellipsis between the first storage server 206 and the second storage server 210 indicates that there may be any suitable number of storage servers. While the communication with the slave volume 208 is shown through the virtual computer system instance 202, it should be recognized that the written information may also be relayed from other systems, such as the first storage server 206. It should also be noted that embodiments describing virtualization is provided for the purpose of illustration, but that components described as virtual may be actual hardware devices. As such, the primary volume 204 could be attached to a physical computer system in a different configuration.

As illustrated in FIG. 2, the environment 200 may include a storage monitoring system 218 and a storage management system 216, which may include a provisioning system 220. The storage monitoring system 218 may receive information 222, 224, and 226 from the host of a virtual computer system instance 202 as well as information about the storage servers 206 and 210 and/or storage server volumes 204, 208, 212, and 214. The storage monitoring system may then use the information 222, 224, and 226 for the collection of various performance measurements to be used in probability models, such as described below. The information collected by the storage monitoring system 218 may also be used in other ways, such as to determine one or more indicators that represent whether the current placement of the primary volume 204 and slave volume 208 are satisfactory. Indicators may include or be based in part on historical, current and/or predicted characteristics and/or information. If one or more of the indicators jointly or individually indicate that the primary volume 204 and/or slave volume 208 should be moved, the storage monitoring system 218 may send one or more packets to the provisioning system 220 that cause the provisioning system 220 to determine a new placement of one or both of the primary volume 204 and slave volume 208. The provisioning system 220 may also use information 222, 224, and 226 to determine the effect transferring a volume 204, 208 would have on potential new hosts for the primary volume 204 and/or slave volume 208. Information about potential hosts may also be used to determine if they are appropriate available implementation resources for one or both of the volumes 204 and 208.

For example, a storage monitoring system 218 server in a low-latency data storage system may receive information 222, 224, and 226 indicating a high utilization of a first storage server 206. For example, the storage monitoring system 218 may use indicators of memory usage, storage capacity, network bandwidth, operating system utilization, read/write operations, etc., to determine if one or more indicators of server health are at or lower than a threshold level. Using the indicators, the storage monitoring system determines that the utilization of the first storage server 206 is too high and must be reduced. The storage monitoring system 218 may then determine that moving volume 204 should sufficiently reduce the utilization of the first storage server 206. The storage monitoring system 218 may request a provisioning system 220 to transfer the volume 204 to a different storage server. Provisioning system 220 may examine one or more available implementation resources, such as free space or volumes in other storage servers, in light of information 222, 224 and 226, associated indicators and indicators associated with volume 204 and make a placement decision. The provisioning system 220 may then cause the volume 204 to be transferred to the available implementation resource.

Figure 3:
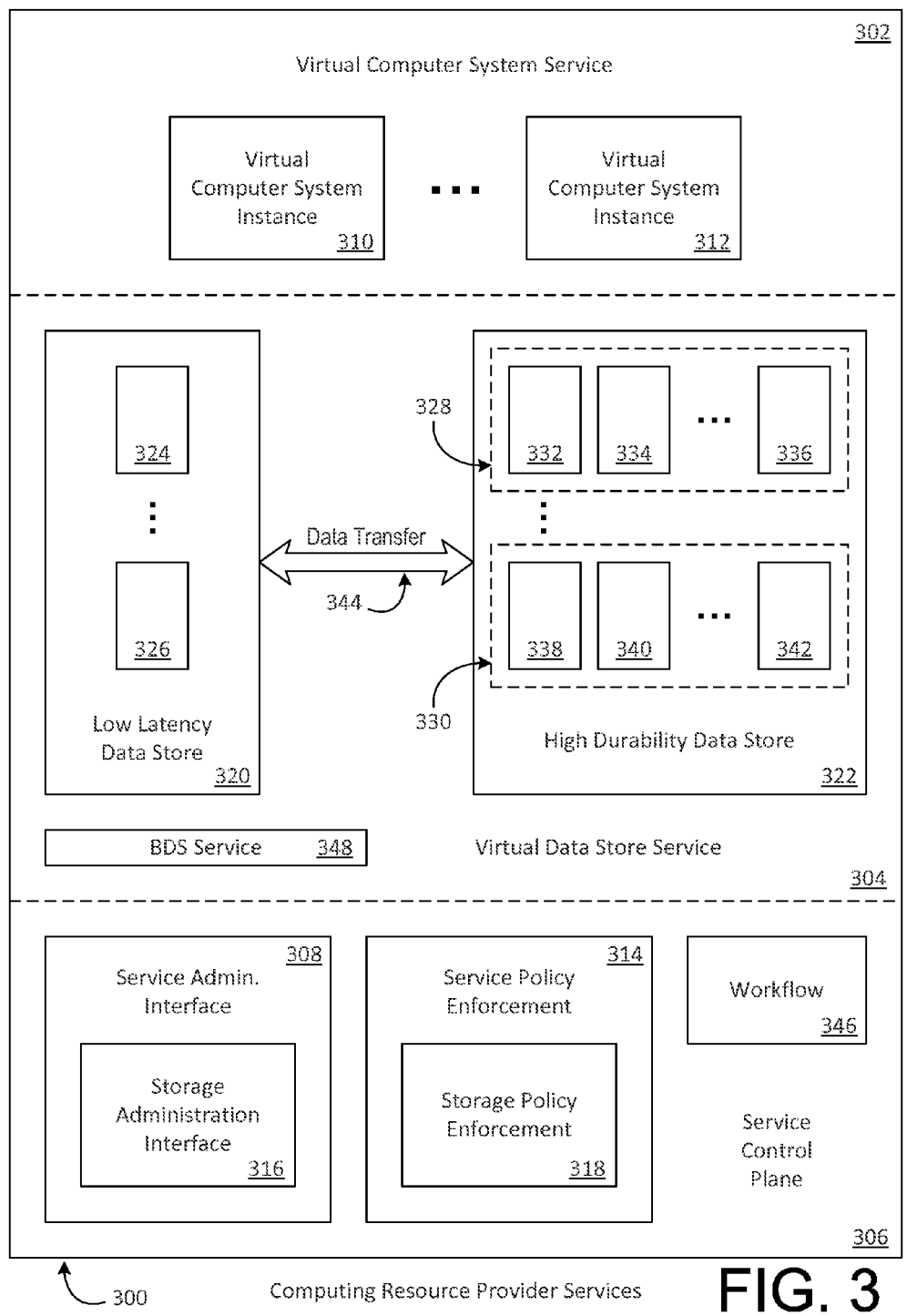
FIG. 3 shows an illustrative example of various services that may be offered by a computer resource provider in accordance with at least one embodiment.

In at least one embodiment, one or more aspects of the environment 200 may incorporate and/or be incorporated into a computing resource service. FIG. 3 depicts aspects of an example computing resource service 300 in accordance with at least one embodiment. The computing resource service 300 provides virtualized computing services, including a virtual computer system service 302 and a virtual data store service 304, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 1006 and the application server 1008 described above with reference to FIG. 10, one or more data stores such as the data store 1010 of FIG. 10, as well as communication bandwidth in the interlinking network. The computing resources managed by the computing resource service 300 are not shown explicitly in FIG. 3 because it is an aspect of the computing resource service 300 to emphasize an independence of the virtualized computing services from the computing resources that implement them.

The computing resource service 300 may utilize the computing resources to implement the virtualized computing services at least in part by executing one or more programs, program modules, program components and/or programmatic objects (collectively, "program components"), including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the computing resource service 300 may supply computing resources elastically and/or on-demand, for example, associated with a per resource unit commodity-style pricing plan.

The computing resource service 300 may further utilize the computing resources to implement a service control plane 306 configured at least to control the virtualized computing services. The service control plane 306 may include a service administration interface 308. The service administration interface 308 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 302 may provision one or more virtual computer system instances 310, 312. The user may then configure the provisioned virtual computer system instances 310, 312 to execute the user's application programs. The ellipsis between the virtual computer system instances 310 and 312 indicates that the virtual computer system service 302 may support any suitable number (e.g., thousands, millions, and more) of virtual computer system instances although, for clarity, only two are shown.

The service administration interface 308 may further enable users and/or administrators to specify and/or re-specify virtualized computing service policies. Such policies may be maintained and enforced by a service policy enforcement component 314 of the service control plane 306. For example, a storage administration interface 316 portion of the service administration interface 308 may be utilized by users and/or administrators of the virtual data store service 304 to specify virtual data store service policies to be maintained and enforced by a storage policy enforcement component 318 of the service policy enforcement component 314. Various aspects and/or facilities of the virtual computer system service 302 and the virtual data store service 304, including the virtual computer system instances 310, 312, the low latency data store 320, the high durability data store 322, and/or the underlying computing resources may be controlled with interfaces such as application programming interfaces (APIs) and/or Web-based service interfaces. In at least one embodiment, the control plane 306 further includes a workflow component 346 configured at least to interact with and/or guide interaction with the interfaces of the various aspects and/or facilities of the virtual computer system service 302 and the virtual data store service 304 in accordance with one or more workflows.

In at least one embodiment, service administration interface 308 and/or the service policy enforcement component 314 may create, and/or cause the workflow component 346 to create, one or more workflows that are then maintained by the workflow component 346. Workflows, such as provisioning workflows and policy enforcement workflows, may include one or more sequences of tasks to be executed to perform a job, such as provisioning or policy enforcement. The workflow component 346 may modify, further specify and/or further configure established workflows. For example, the workflow component 346 may select particular computing resources of the computing resource service 300 to execute and/or be assigned to particular tasks. Such selection may be based at least in part on the computing resource needs of the particular task as assessed by the workflow component 346. As another example, the workflow component 346 may add additional and/or duplicate tasks to an established workflow and/or reconfigure information flow between tasks in the established workflow. Such modification of established workflows may be based at least in part on an execution efficiency analysis by the workflow component 346. For example, some tasks may be efficiently performed in parallel, while other tasks depend on the successful completion of previous tasks.

The virtual data store service 304 may include multiple types of virtual data store such as a low latency data store 320 and a high durability data store 322. For example, the low latency data store 320 may maintain one or more data sets 324, 326 which may be read and/or written (collectively, "accessed") by the virtual computer system instances 310, 312 with relatively low latency. The ellipsis between the data sets 324 and 326 indicates that the low latency data store 320 may support any suitable number (e.g., thousands, millions, and more) of data sets although, for clarity, only two are shown. For each data set 324, 326 maintained by the low latency data store 320, the high durability data store 322 may maintain a set of captures 328, 330. Each set of captures 328, 330 may maintain any suitable number of captures 332, 334, 336 and 338, 340, 342 of its associated data set 324, 326, respectively, as indicated by the ellipses. Each capture 332, 334, 336 and 338, 340, 342 may provide a representation of the respective data set 324 and 326 at a particular moment in time. Such captures 332, 334, 336 and 338, 340, 342 may be utilized for later inspection including restoration of the respective data set 324 and 326 to its state at the captured moment in time. Although each component of the computing resource service 300 may communicate utilizing the underlying network, data transfer 344 between the low latency data store 320 and the high durability data store 322 is highlighted in FIG. 3 because the contribution to utilization load on the underlying network by such data transfer 344 can be significant.

For example, the data sets 324, 326 of the low latency data store 320 may be virtual disk files (i.e., file(s) that can contain sequences of bytes that represent disk partitions and file systems) or other logical volumes. The low latency data store 320 may include a low overhead virtualization layer providing access to underlying data storage hardware. For example, the virtualization layer of the low latency data store 320 may be low overhead relative to an equivalent layer of the high durability data store 322. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 320 and the high durability data store 322, respectively, are substantially disjointed. In a specific embodiment, the low latency data store 320 could be a Storage Area Network target or the like. In this example embodiment, the physical computer system that hosts the virtual computer system instance 310, 312 can send read/write requests to the SAN target.

The low latency data store 320 and/or the high durability data store 322 may be considered non-local and/or independent with respect to the virtual computer system instances 310, 312. For example, physical servers implementing the virtual computer system service 302 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 310, 312 may have a validity lifetime corresponding to the virtual computer system instance 310, 312, so that if the virtual computer system instance 310, 312 fails or is de-provisioned, the local data is lost and/or becomes invalid. In at least one embodiment, data sets 324, 326 in non-local storage may be efficiently shared by multiple virtual computer system instances 310, 312. For example, the data sets 324, 326 may be mounted by the virtual computer system instances 310, 312 as virtual storage volumes.

Data stores in the virtual data store service 304, including the low latency data store 320 and/or the high durability data store 322, may be facilitated by and/or implemented with a block data storage (BDS) service 348 at least in part. The BDS service 348, which may include the storage management system 216 of FIG. 2, may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may, in some embodiments, be organized into one or more pools or other groups that each has multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 348 may facilitate and/or implement local caching of data blocks as they are transferred through the underlying computing resources of the computing resource service 300, including local caching at data store servers implementing the low latency data store 320 and/or the high durability data store 322, and local caching at virtual computer system servers implementing the virtual computer system service 302. In at least one embodiment, the high durability data store 322 is an archive quality data store implemented independent of the BDS service 348. The high durability data store 322 may work with sets of data that are large relative to the data blocks manipulated by the BDS service 348. The high durability data store 322 may be implemented independent of the BDS service 348. For example, with distinct interfaces, protocols and/or storage formats.

Each data set 324, 326 may have a distinct pattern of change over time. For example, the data set 324 may have a higher rate of change than the data set 326. However, in at least one embodiment, bulk average rates of change insufficiently characterize data set change. For example, the rate of change of the data set 324, 326 may itself have a pattern that varies with respect to time of day, day of week, seasonally including expected bursts correlated with holidays and/or special events, and annually. Different portions of the data set 324, 366 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

Figure 4:
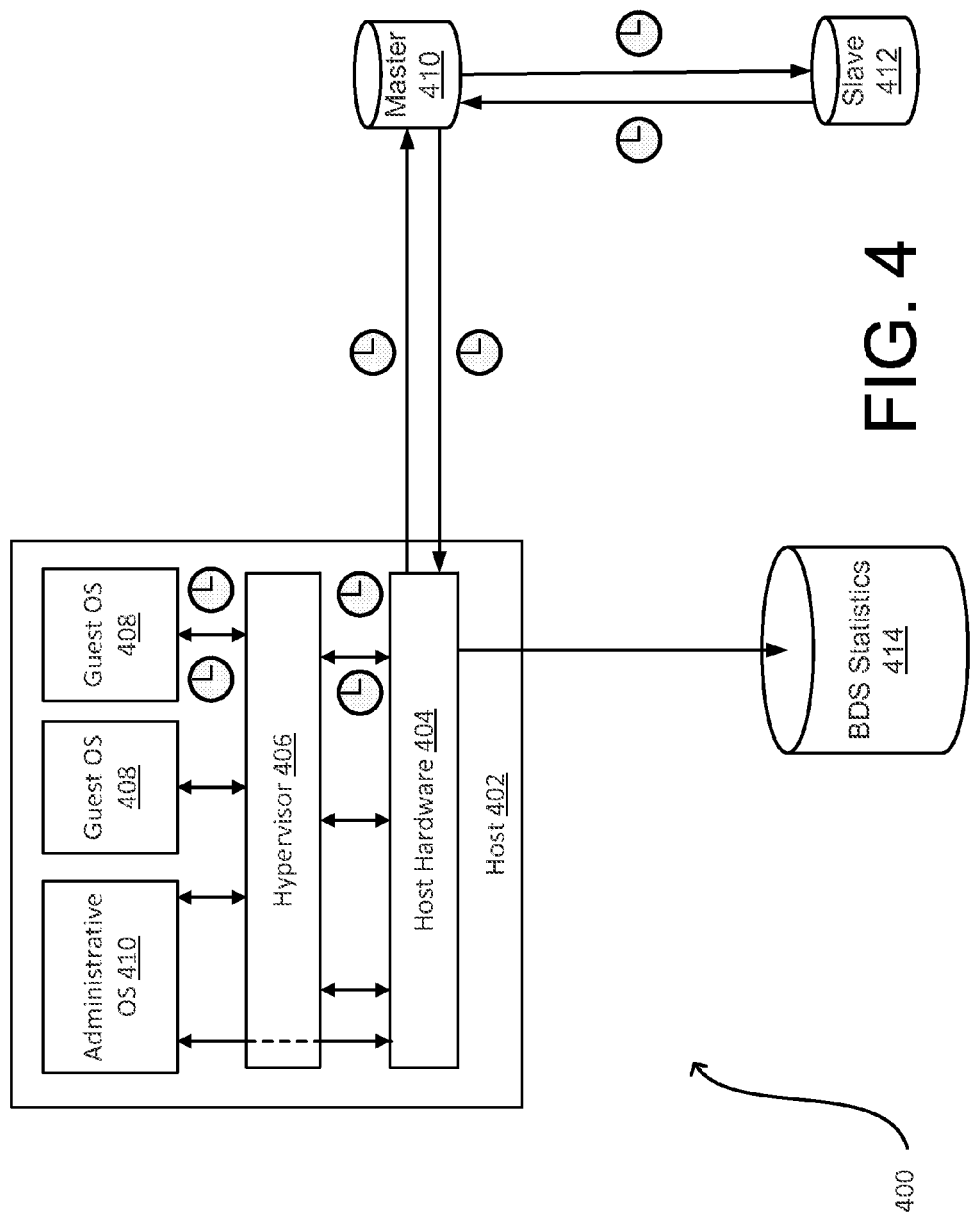
FIG. 4 shows an illustrative example of an environment in which various embodiments may be implemented and which illustrates various performance metrics which may be utilized in accordance with at least one embodiment.

Computer system hardware may be abstracted using virtualization techniques to simultaneously operate a plurality of guest operating systems. FIG. 4 illustrates an environment 400 utilizing one such technique, using a virtual machine monitor or hypervisor. The hardware 404 of a host 402, in some embodiments, may be used to implement various computer systems, such as computer systems described above. For example, the host 402 illustrated in FIG. 4 may be used to implement a computer system to which a storage volume is attached. The hardware of the host 402, in various embodiments, interfaces with a virtual machine monitor or hypervisor 406 running directly on the hardware, e.g., a "bare metal" or native hypervisor. Examples of such hypervisors include Xen, Hyper-V® and the like. Hypervisors typically run at a higher, more privileged processor state than any other software on the machine, and provide services such as memory management and processor scheduling for dependent layers and/or domains. The most privileged of such layers and/or domains resides in the service domain layer, which may include an administrative operating system 410 for configuring the operation and functionality of the hypervisor, as well as that of domains of lower privilege, such as guest domains including guest operating systems 408, which may be heterogeneous (e.g., running different operating systems than each other). The service domain may have direct access to the hardware resources of the host 402 by way of the hypervisor, while the user domains may not. Techniques illustratively described herein are also applicable to code running within or upon other types and subtypes of virtualization, such as hardware virtualization, software virtualization, hardware-assisted virtualization (such as virtualization techniques utilizing Intel® VT-x, VT-i and/or AMD® AMD-V implementations), full virtualization, paravirtualization, partial virtualization, and any variants and/or subtypes thereof.

As illustrated in FIG. 4, a guest operating system 408 of the host 402 may implement a client of a data storage volume. As illustrated in FIG. 4, the volume may be implemented using a master 410 volume, which may be a primary volume such as described above in connection with FIG. 2, and a slave 412 volume. As shown in FIG. 4, the host 402, according to the operation of a client operating on a guest operating system 408, communicates with the master 410 to perform input/output operations. While not illustrated in the figure for the purpose of simplification of illustration, communications with the master may be through a storage server. Similarly, communications with the slave 412 may be through a separate storage server. Further, as illustrated in the figure, when the master 410 is used for input/output operations, communication between the master 410 and slave 412 may follow, such as to synchronize the slave with the master should the slave become needed, such as for failover and/or to being used for read operations in parallel with the master.

As indicated by the clocks in FIG. 4, various processes involved with the operation of a storage volume (or, generally, of a computing resource) can be measured. For example, in the environment illustrated in FIG. 4, a read or write operation can involve multiple sub-processes (sub-operations). For example, as noted above, a storage volume may be logically attached to a computer system instance implemented by the host 402 in a guest operating system 408. A data operation (e.g., read, write, update, or delete operation) can involve transmitting a request to the storage volume (e.g., to a storage server serving the storage volume) and receiving an acknowledgment of the request. Also, as noted above, the operation may also involve communication between master 410 and slave 412 for the purpose of synchronization. Transmitting the request itself may include various sub-processes. For instance, a guest operating system 408 may transmit the request through a more privileged domain (e.g., a domain in which the administrative operating system 408 operates), which may instruct a network card to transmit the request over a network. The time it takes the more privileged domain to process the request may be timed, as may the time it takes the network card to transmit the request to the network. The time it takes the request to travel over the network to the data storage server may also be timed. Network hops between the client and server may also be timed. At the server, the time the request sits in a request queue as well as the length of the request queue may be measured. The time it takes a physical storage device to perform a read, write or other operation may be measured. As with the request travelling from the client to the server, various aspects of a communication of an acknowledgment of an operation being performed may also be measured, such as various latencies and processing times.

Other performance measurements may also be utilized. For example, the total time spent doing work on the server in connection with processing a request may be measured. This may include operations from reading in the request on the socket to sending out the reply after the I/O is completed. A local disk time may also be measured. The local disk time may be a time a physical storage device spends performing an I/O operation. A network request receipt time, the time a request spends travelling across a network from client to server may be measured. This metric may an approximation of the network time. In some embodiments, for example, the timer is started, the I/O request is written to the socket (sock_sendmsg( )), and the timer is stopped. While TCP_NODELAY may be set on the socket to disable Nagel's algorithm, for small requests (e.g. read requests), this, in some instances, may measure the speed of the transmission control protocol (TCP) buffer. For larger requests (write requests), the buffer is more likely to fill, and this will observe the time from the first byte written until the last byte is placed on the network. It will return once the last byte is handed to the TCP stack.

Similar to the network request receipt time, the time the block device response spends traveling across the network from the server to the client may also be measured. In order to determine when to start the timer, the client may block on a read (sock_recvmsg( )) for a global network block device (GNBD) GNBD header (e.g., 16 bytes). Once it receives the header, it may start the timer, read the remainder of the response, and then stop the timer. A queue wait time may also be measured. The queue wait time may be the time a request spends in a data storage server queue after the request is pulled off the socket and before the request is serviced as an I/O request.

Various performance metrics involving other services may also be measured. For example, in some embodiments, a block data storage service communicates with a high durability data storage service for various purposes, such as for storing snapshots of storage volumes. Latencies communication with the other services may, for example, be measured. The latencies may include times to receive responses from the other service, times for the other service to complete an operation, and times for obtaining data from the other storage service, such as snapshots.

As noted above, various metrics involving communications between a master and slave may also be measured. For example, in an embodiment, the time spent sending writes to the slave may be measured. Times from the start of sending a mirror write to the slave to receipt of a response from the slave (by the master) may also be measured. Times for receipt of acknowledgments from a slave (to the master) may be measured. Another metric may come into play when the master sends a mirror write to the slave and the slave responds by asking for the full chunk to be sent over. This metric may involve a measurement of the time for the master to read the entire chunk from disk before sending it to the slave. As another example, the time it takes to send a full chunk write to the slave may be measured. Such an operation may occur when the slave responds to a mirror write asking the master to send the full chunk.

Other metrics that may be used include, for a storage volume acting as a master, the time to read the request in, the time to send reply back to client on the network, the time to read from local disk, time to read data from another storage service (e.g., a high-durability storage service), the time waiting for another storage service to free up, the time a read request spends in a request queue, the time a write request spends in a request queue, the time waiting for a throttling component to release a request, the total time an operation took to complete, the time to read a write request from a network, the time to send a reply to network, the time to write to local disk, the time to prepare the mirror slave for sending data, the time to send to mirror slave, the time to send to get an acknowledgment from mirror slave, the time to read a full chunk to send to the mirror, the time to send a full chunk to the mirror, the time waiting to read data off a socket to enqueue and/or other metrics. Metrics may also involve measurements of others' activity on shared resources. For example, in an environment where a data storage server serves storage volumes for multiple entities (e.g., multiple customers of a computing resource provider), for a particular storage volume served by a storage server, measurements involving others' activity in connection with the storage server may also be measured. The activity may be, for example, IOPS by the others and/or any of the measurements discussed above.

The metrics may be collected in various ways. For example, as illustrated in FIG. 4, various measurements may be made in different locations of a network. Various devices in the network are involved in the timing of various operations involved in input/output. Such devices may be configured to transmit measurements over the network to an entity configured to collect and/or process measurements. For example, in many examples, measurements are made in connection with a request in transit. Measurements may be piggybacked onto the communications involved in the request, such as in annotations to the requests and/or acknowledgments. For example, as illustrated in FIG. 4, the host 402 receives measurements that have been added to communications while in transit and included in an acknowledgment. The host 402 may transmit the measurements (or data based at least in part on the measurements) to a BDS statistics data store 414 (i.e., to a server serving the BDS statistics data store), which may be a component of a storage monitoring system, such as described above in connection with FIG. 2. It should be noted, however, that measurements may be sent to a collecting entity in other ways and not necessarily through the host 402.

Figure 5:
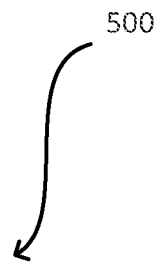
FIG. 5 shows a table having an illustrative example of a classification of health states for volumes in accordance with at least one embodiment.

In an embodiment, the performance of a volume is categorized into one of a plurality of health states. The health states may each correspond to a particular level of performance measured in terms of the number of IOPS that it is able to provide. That is, the number of IOPS a computer system logically or otherwise attached to the volume is able to achieve while using the volume. FIG. 5, accordingly, shows an illustrative example of a table 500 for classifying the health state of a volume. The table 500 in this example includes four different health states. In other embodiments, a different number of states may be used. In an embodiment, the health state of a volume corresponds to some range of performance relative to a desired performance, where the desired performance may be measured in various ways, such as a number of IOPS.

In an embodiment, health states are based at least in part on a desired performance. For storage volumes hosted by a computing resource provider, the desired performance may be based at least in part on a service level agreement with customers. Further, the health state may be based at least in part on an average performance over a period of time, such as a minute or hour or other time period. In the embodiment illustrated in FIG. 5, the volume health state is designated as healthy if the measured performance is above 90% of a desired performance. For example, if the desired performance of the volume is 100 IOPS, if the performance of the volume is measured to be over 90%, that is, over 90 IOPS, then the volume would be designated by the table 500 as being healthy. If the volume is able to provide a measured performance that is above 50% of the desired performance, but less than or equal to 90% of the desired performance, the volume may be designated as having a health state of degraded, where degraded may correspond to a level of volume health where the volume is not operating as desired. If the volume has a measured performance that is nonzero, but less than or equal to 50% of the desired performance in an embodiment, the volume is designated as having a health state of severely degraded. Similarly, if the volume's measured performance is equal to 0% of the desired performance, the volume may be designated as having a health state of operable, that is the volume is unable to be used for its intended purpose.

It should be noted that while discussing the performance of the volume, the volume's performance may be affected by some aspect of a larger distributed system and not necessarily a storage device used to implement the volume. For example, as noted above, various embodiments of the present disclosure utilize environments where computer systems, which may be virtual computer systems, are logically attached to a volume where the volume is served by a data storage server separate from the computer system. In this manner, communications between the computer system and the volume travel over a network. The malfunction of a device in the network through which communications travel may be a reason for a volume's inability to perform at a certain level. It should be noted that the number of health states and the ranges corresponding to the health states are provided for the purpose of illustration and that different ranges and/or numbers of health states may be used. In some embodiments, the health state may not fall into discrete categories, but may be a value on a continuum. For example, in some embodiments, the health state is simply the percentage of the measured performance relative to the desired performance.

Figure 6:
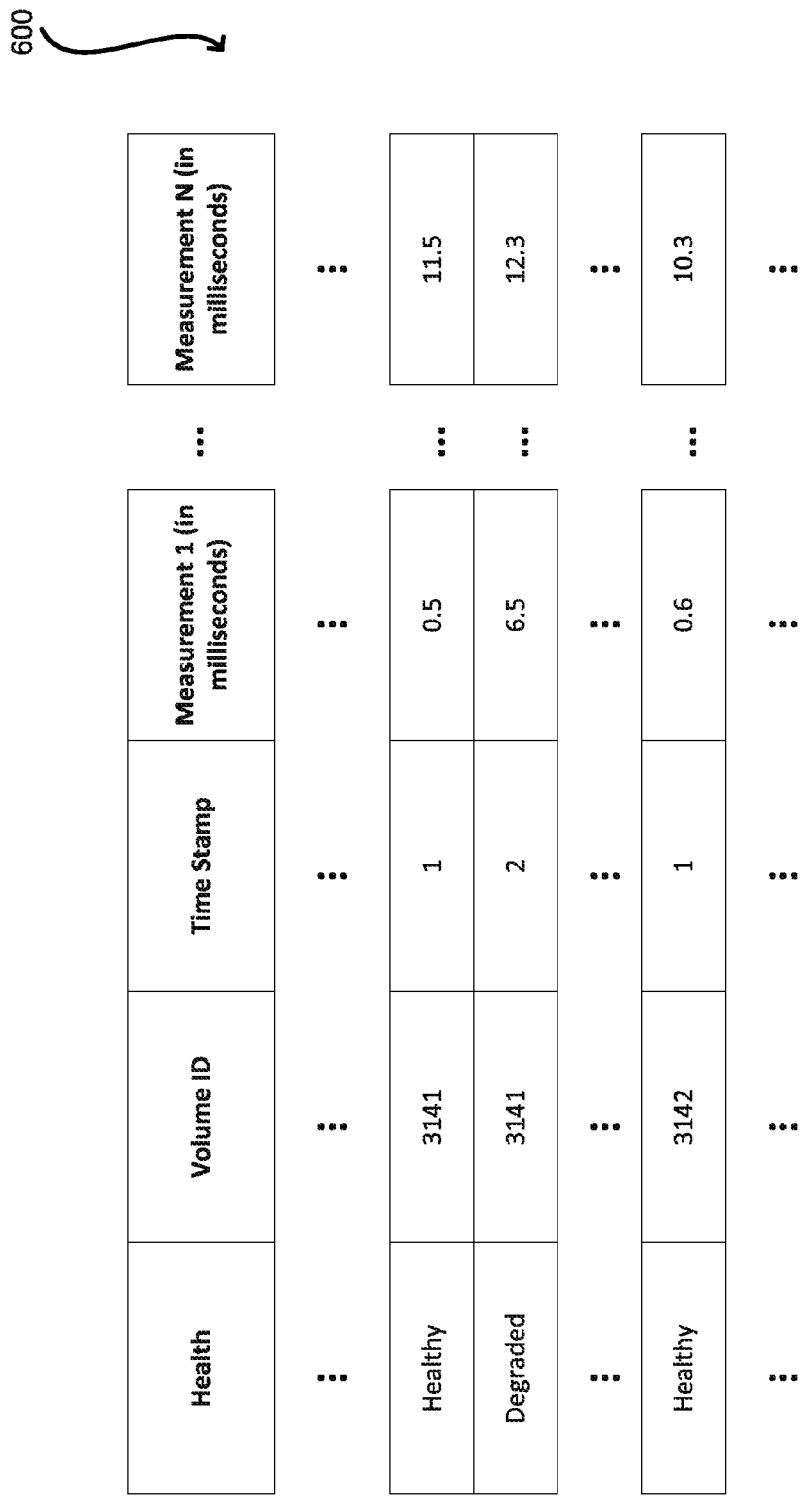
FIG. 6 shows an illustrative representation of a database used to collect performance data in accordance with at least one embodiment.

FIG. 6 shows an illustrative example of a database 600 which may be used to collect information about volumes in accordance with an embodiment. A database, such as the database 600, may be stored by any suitable device, such as a device storing the BDS statistics 414 illustrated in FIG. 4. Returning to FIG. 6, in this particular example, the database 600 is a relational database comprising a table organized by columns where various columns of the database 600 correspond to some aspect of a volume. For example, as illustrated in FIG. 6, the database 600 includes a health column where entries in the health column indicate a measured health of the volume, such as according to a scale of health, such as described above in connection with FIG. 5. Also, as illustrated in FIG. 6, the database 600 includes a volume ID column, the entries of which correspond to an identifier of a corresponding volume, where the identifier may be an identifier utilized by a system in which the volume operates, such as by a management system of a computing resource provider hosting the volume and/or other systems of the computing resource provider that utilize the identifier. Further, as illustrated in FIG. 6, the database 600 includes a time stamp column, the entries of which indicate a time stamp for which information in a corresponding row corresponds.

Multiple other columns of the database 600 in an embodiment correspond to various measurements taken in connection with the volume's operation. The measurements may be, for example, timing measurements, such as described above in connection with FIG. 4. While not illustrated as such, other columns may also be included in the database 600, such as columns for various characteristics of a system in which the volume is used. For example, a volume may be implemented using one of several different hardware types. For instance, some volumes may be implemented by magnetic storage devices and other volumes may be implemented using solid state drives (SSDS); thus, a column in the database 600 may correspond to that hardware type. Similarly, a virtual computer system to which the volume is logically attached may be one of several different types of virtual computer system available, where the type generally corresponds to some type of hardware capacity reserved for the virtual computer system. Accordingly, a column in the database 600 may correspond to the type of virtual machine to which the volume is logically attached or a type of physical machine to which the volume is attached.

Generally, any characteristic of a computer system in which the volume operates may be represented by a column in the database 600. As noted above, each row in the database 600 corresponds to measurements taken in connection with the volume's performance during a particular time identified in the time stamp column for a particular volume identified in the volume ID column.

As illustrated in FIG. 6, a single volume may have information stored in multiple rows of the database 600 where each row corresponds to a different time. In an embodiment, for a period of time for each row in the database 600 is one minute, although other times may be used. Further, the information corresponding measurements in a row may be averages of actual measurements made during the corresponding time period. For example, looking to the row for Volume ID 3141 having the time stamp 1, i.e., the first minute for which the measurements were taken for the volume having ID 3141, a measurement identified as measurement 1 has a value of 0.5 milliseconds. During the minute for which the row corresponds, many measurements corresponding to measurement 1 may have been taken and their average may be 0.5 milliseconds.

Figure 7:
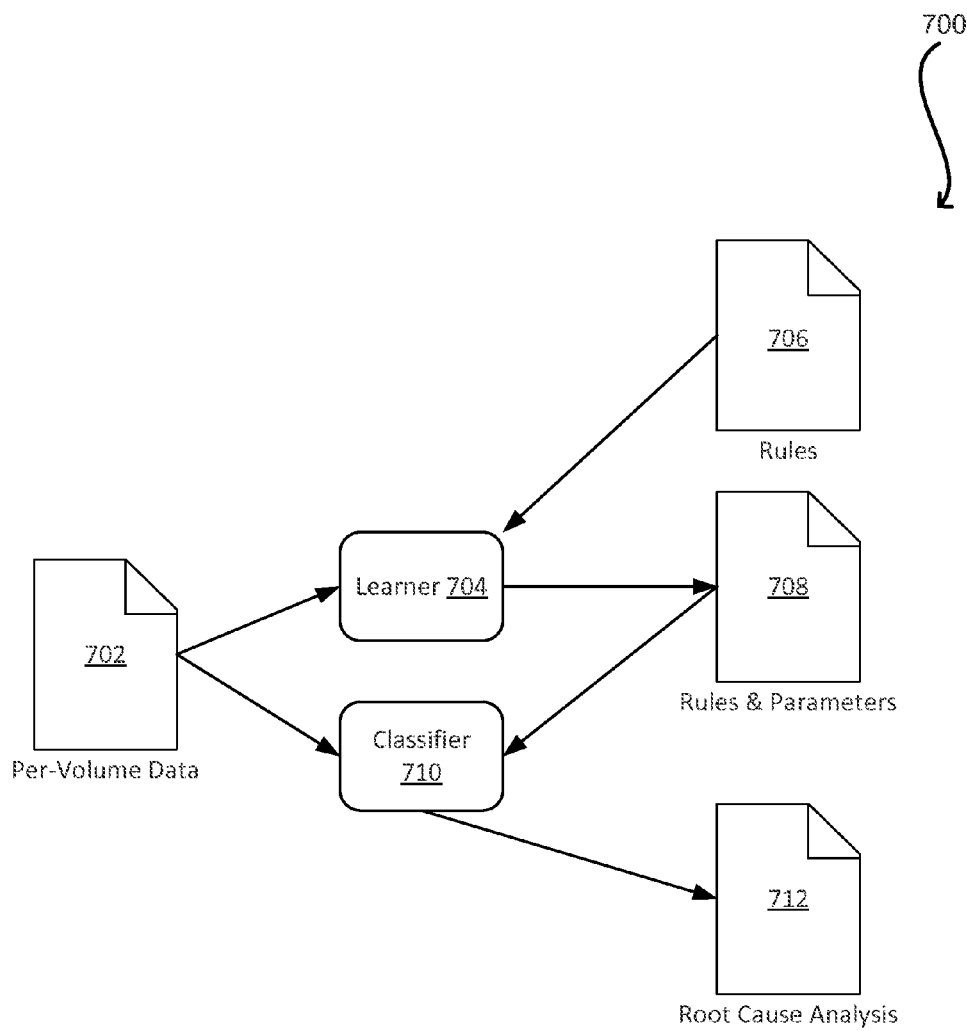
FIG. 7 shows an illustrative representation of an environment for configuring a system to operate in accordance with various embodiments.

FIG. 7 shows an illustrative example of an environment 700 which illustrates how a system may be configured to operate in accordance with various embodiments. In an embodiment, per-volume data 702 is provided to a learner 704. The per-volume data may be data organized in any suitable form, such as a relational table, such as described above in connection with FIG. 6. The per-volume data may be provided in a batch and may be provided in other ways. For example, per-volume data may be provided over time as the per-volume data is obtained. The learner 704 may be a computer system or programming module operating on a computer system that is configured to analyze the per-volume data. Rules 706 may be provided to the learner in order to guide the analysis. The rules may comprise encodings of conditional probabilities for the learner 704 to calculate based, at least in part, on the per-volume data 702. For example, a rule may be in the form of the probability of a volume being in a particular state given that a performance measurement of the volume falls within a particular range. Probabilities may be also contingent on multiple performance measurements. For example, a rule may be of the form of a probability that a volume is in a particular health state given that a first metric is in a first range and a second metric is in a second range.

As rules 706 are provided to the learner 704, the learner 704 may calculate the probabilities based at least in part on the per-volume data 702 that the learner 704 has received. Accordingly, in an embodiment, the learner 704 provides rules and parameters 708. The rules and parameters may be sets of probabilities that a volume is in a particular health state given various ranges of a metric. The rules and parameters may be included in any suitable manner, such as a contingency table or collection of contingency tables that each has entries on one axis corresponding to health states of a volume and another axis corresponding to ranges of a metric. In this manner, when a volume is measured to have a particular performance metric, the rules and parameters may be used to find the most likely root cause.

As illustrated in FIG. 7, per-volume data may also be provided to a classifier 710, which like the learner 704, may be a computer system or program module operating on a computer system that is configured to receive per-volume data as input and provide route cause analysis 712. Per-volume data 702 provided to the classifier 710 may be data for a particular volume whose performance has been measured. For example, referring to FIG. 6, per-volume data may correspond to a row in the database 600. It should be noted that the learner 704 and classifier 710 may be part of the same computer system or different computer systems. The root cause analysis provided by the classifier 710 may be information corresponding to a most likely root cause of a performance health state of a volume based, at least in part, on the rules and parameters 708 provided to the classifier 710. The information in the root cause analysis may be provided in any suitable manner. For example, the root cause analysis may include information corresponding to a most likely cause of the volume health state and/or a ranking of possible causes of the health state, where the ranking is based, at least in part, on probabilities calculated by the learner 704.

Figure 8:
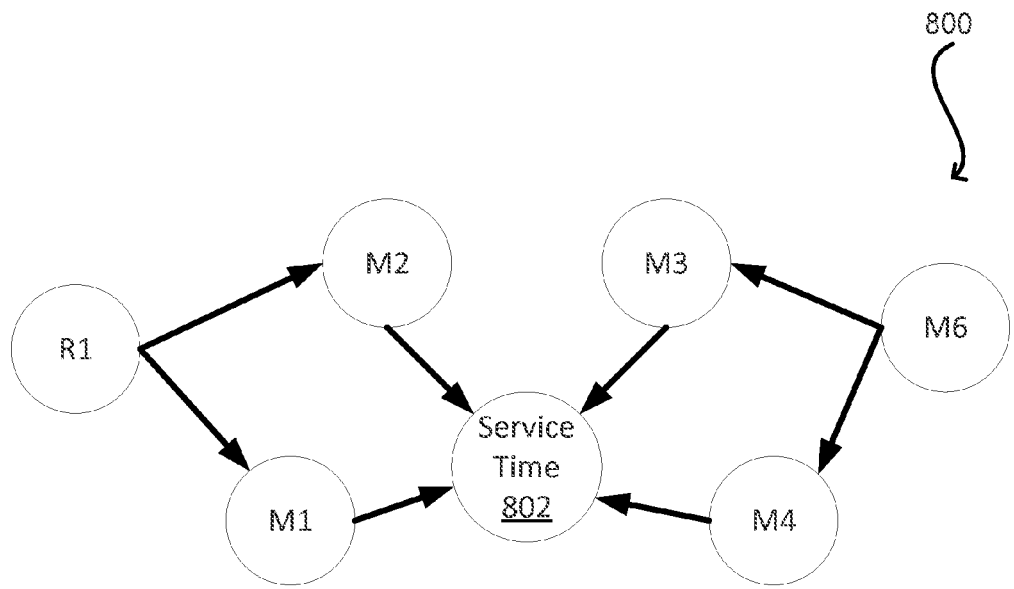
FIG. 8 shows an illustrative example of a graphical probabilistic model that can be used in accordance with various embodiments.

Various embodiments of the present disclosure utilize graphical probability models for the purpose of analysis, both in learning probabilities of various causes for volume states and for analyzing current performance data for a particular volume. FIG. 8 shows an illustrative example of a graphical probability model 800. In an embodiment, a graphical probability model is a directed graph with nodes corresponding to various performance metrics. In this particular example, a service time node 802 depends directly from four different performance metrics labeled M1, M2, M3 and M4. Accordingly, each of M1, M2, M3 and M4 are represented by a separate node in the graph. An edge connecting each of M1, M2, M3 and M4 to the service time node 802 is a directed edge pointing to the service time node 802. For example, a node labeled M1 has an edge directed to the service time node 802, thereby indicating that service time depends from M1. As illustrated in FIG. 8, root causes, such as a root cause labeled R1, are represented by a node labeled R1 in the graph 800 and may be modeled by various performance metrics. For instance, in FIG. 8, a root cause (e.g., a device malfunction) has an effect on both the metrics M1 and M2.

The graphical probability model can be generated in any suitable way. For example, the relationships between nodes can be specified by a user and/or learned by a computer system based at least in part on historical data. Further, the model may be used in various ways. For instance, referring to the particular graphical probability model in FIG. 8, the root cause R1 is modeled to be able to cause changes to M1 and M2. If analysis of contingency tables in connection with a volume having a particular health state indicates the probability of being in the particular health state being higher given M1 and/or M2 being within a range in which measured values fall for the volume, the graphical probability model can be used to indicate R1 as the root cause of the particular health state. It should be noted that information output by a computer system operating in accordance with various embodiments described herein may output different types of information. For example, the information output may indicate explicitly or implicitly the root cause. For instance, referring to FIG. 8, output of a system may specifically indicate R1 or may implicitly indicate R1 by indicating explicitly M1 and/or M2. Other variations are also considered as being within the scope of the present disclosure.

Figure 9:
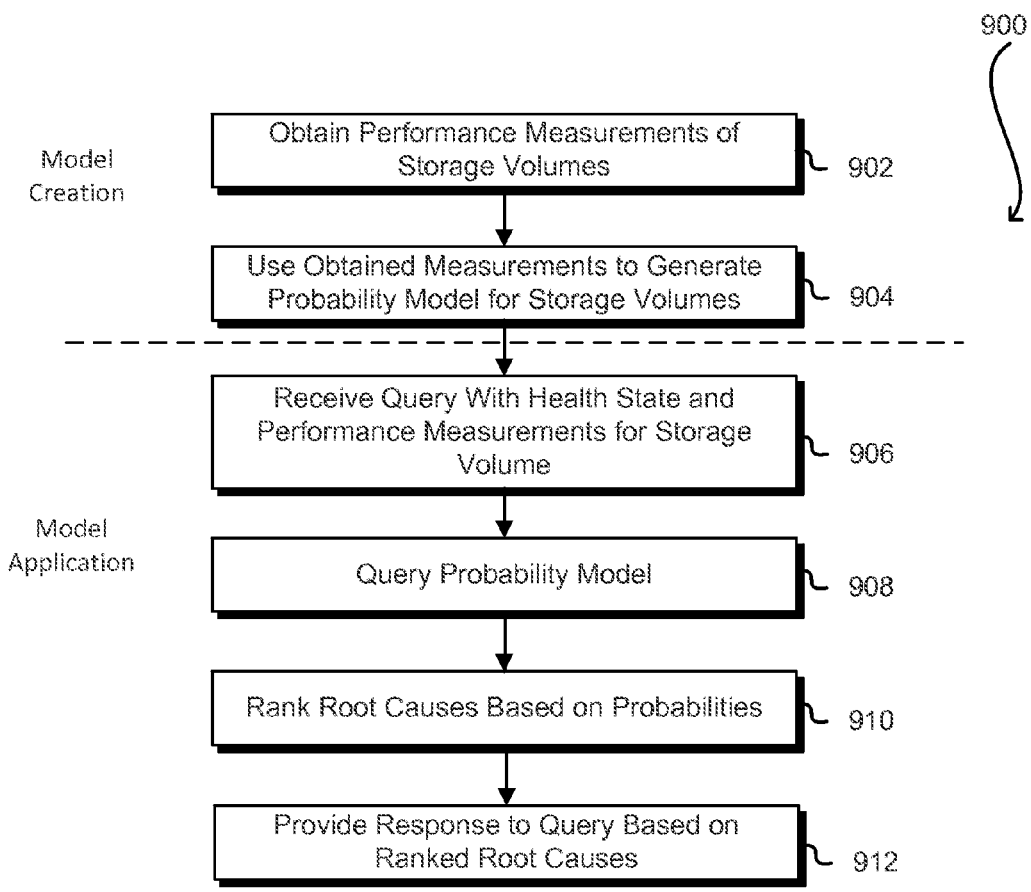
FIG. 9 shows an illustrative example of a process for generating and using a probability model in accordance with at least one embodiment.

FIG. 9 shows an illustrative example of a process 900 which may be used to incorporate various embodiments of the disclosure discussed above. The process 900 may be performed by any suitable system, such as by a system incorporating a probabilistic query engine, such as described above, and a system incorporating a learner and classifier, such as described above. Some or all of the process 900 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an embodiment, the process 900 includes two stages, model creation and model application. During model creation, the process 900 may include obtaining 902 performance measurements of storage volumes. The performance measurements may be obtained 902 in any suitable manner, such as in manners described above. Further, as noted above, the measurements may be statistically processed. For example, the measurements may be averages over a time period and may be normalized to take into account different types of use of storage volumes. It should be noted that obtaining 902 performance measurements may include obtaining other information relevant to analysis in accordance with various embodiments, such as other measurements and/or characteristics of respective storage volumes, and health states for the volumes at a time when the measurements were taken. It should also be noted that, while the process 900 is described in connection with storage volumes, the techniques are applicable to other computing resources.

Also part of the model creation state, the process 900 includes using 904 the obtained measurements to generate a probability model for data storage volumes. The probability model may comprise a set of contingency tables, each of which associates probabilities with health states and ranges for a corresponding metric. For example, one contingency table may organize contingent probabilities for each of a plurality of health states. For each health state, for instance, the table may encode a probability that a volume is in the health state given a measurement falling within a particular range, for each of a plurality of ranges. Other probability models may also be used. For example, instead of tables, probability functions may be interpolated or otherwise determined from the obtained measurements. Instead of discrete ranges and/or health states, the probability may be a continuous function of a measurement representing a health state (e.g., percentage of desired IOPS achieved) and one or more measurements.

Turning to the model application stage of the process 900, in an embodiment, the process 900 includes receiving 906 a query for a particular volume. The query may have been submitted by a technician or by an automated process of a computer system involved in the monitoring and/or diagnosis of storage volumes. The query may specify or otherwise indicate a health state and one or more measurements of the volume taken while in the indicated health state. The process 900 may include querying 908 a probability model to determine probabilities for various root causes. For example, in some embodiments, the measurements and health state indicated in the query may be looked up 908 in one or more contingency tables that encode the generated probability model. As noted above, other ways of encoding a probability model may be used and the process 900 may be modified accordingly. Returning to the illustrated embodiment, the root causes (or other associated information, such as metrics corresponding to root causes) may be ranked 910 using the probability, such as according to lookups in one or more contingency tables. For example, metrics associated with higher probabilities may be ranked higher.

Once the metrics or other information has been ranked, the process 900 may include providing 912 a response to the query based at least in part on the ranked root causes (or other information). For example, a list of the root causes may be provided according to the ranking. A graphical probability model may be used to identify root causes that are associated, by the graphical probability model, with metrics ranked in accordance with the probability model. One or more such root causes may be provided in a ranking according to the raking of associated metrics. The information may be provided in any way. For example, if the query was submitted from another computer system different from the computer system processing the query, providing the response may include transmitting one or more electronic messages that encode the response over a network to the requestor. If the query was submitted from the computer system that processes the query, providing the response may include causing a display device (e.g., monitor or touchscreen) to display the response or information based thereupon. In some embodiments, a system is configured with the ability to submit queries, receive responses, and address root causes according to the responses. For example, referring to FIG. 2, the storage management system may be able to receive a response to the query and take corresponding action. Depending on the root cause, the corresponding action may be one that the storage management system is able to address, such as by causing the provisioning system to reprovision a computing resource, causing a computer system instance to reboot, updating routing tables to cause a rerouting of network traffic and/or in other ways. Generally, the information may be provided in any suitable manner.

Figure 10:
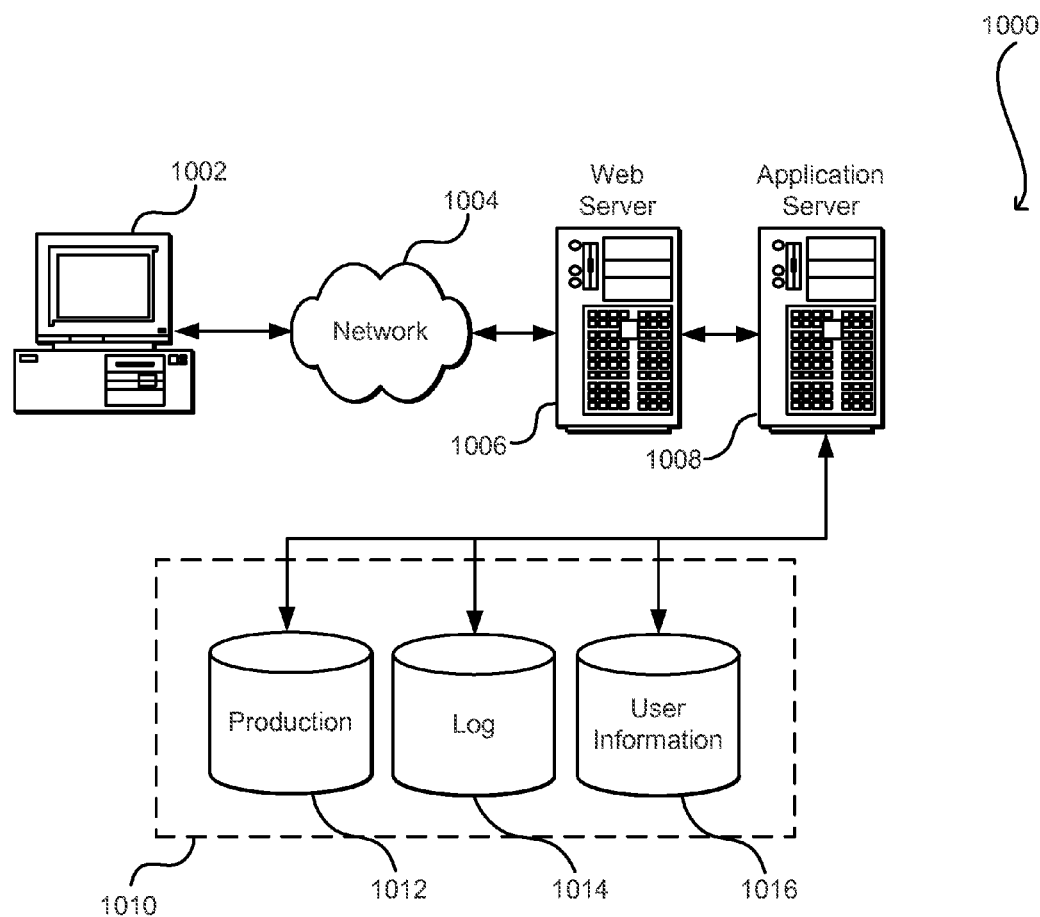
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Although Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
      for a plurality of storage volumes in a distributed computing environment, obtaining performance metric values for each of a plurality of performance metrics;
      analyzing the obtained performance metrics to determine a probability model that, for each storage volume health state of a plurality of storage volume health states, models probabilities that the volume health state is caused by corresponding issue;
      obtaining, for a particular storage volume, a health state for the storage volume and a set of performance metric values for the particular storage volume;
      using the determined probability model to determine, based at least in part on the obtained health state and set of performance metric values for the particular storage volume, an issue potentially causing the health state of the particular storage volume; and
      provide information identifying the determined issue.

2. The computer-implemented method of claim 1, wherein at least some of the performance metrics are latency metrics for input/output communications between clients and corresponding data storage servers.

3. The computer-implemented method of claim 1, wherein communication between the clients and corresponding data storage servers comprises multiple processes and the plurality of performance metrics includes a performance metric for each of at least some of the plurality of performance metrics.

4. The computer-implemented method of claim 1, wherein using the determined probability model to determine the issue potentially causing the health state comprises:
   for each performance metric value of at least two of the performance metric values, determining a probability that a storage volume having the health state is in a range of performance metric values that includes the performance metric value; and
   using the determined probabilities to identify the issue.

5. The computer-implemented method of claim 1, wherein:
   determining the issue potentially causing the health state includes determining a plurality of issues potentially causing the health state, the plurality of issues being ranked according to the probability model; and
   the information identifying the determined issue identifies at least one other issue from the determined plurality of issues.

6. The computer-implemented method of claim 1, wherein using the determined probability model to determine the issue and providing the information are performed in response to a detected change in health state of the particular storage volume.

7. A computer-implemented method, comprising: under the control of one or more computer systems configured with executable instructions, obtaining a probability model for computing resources, the probability model based at least in part on measurements of multiple processes involved in operation of the computing resources, wherein the computing resources are storage volumes; for a particular computing resource, obtaining measurements taken during a performance degradation of the particular computing resource for at least some of the multiple processes; and using the obtained measurements for the particular computing resource and the probability model to diagnose the performance degradation.

8. The computer-implemented method of claim 7, wherein the multiple processes involve multiple devices in a network supporting the computing resources.

9. The computer-implemented method of claim 7, wherein:
   the computing resources communicate with other computing resources; and
   the measurements of multiple processes include, for each computing resource of a plurality of the computing resources that communicates with another computing resource, latencies for different portions of a communications route between the computing resource and the other computing resource.

10. The computer-implemented method of claim 7, wherein:
   the method further comprises:
   obtaining the measurements;
   using the measurements to generate a contingency table; and
   the probability model is based at least in part on the contingency table.

11. The computer-implemented method of claim 7, wherein:
the method further comprises:
obtaining the measurements;
using the measurements to generate a logistic regression model; and
the probability model is based at least in part on the logistic regression model.

12. The computer-implemented method of claim 7, wherein:
the probability model associates each health state of a plurality of health states with a probability of being in the health state; and
the performance degradation corresponds to a change from a first health state of the plurality of health states to a second health state of the plurality of health states.

13. The computer-implemented method of claim 7, wherein:
the performance degradation corresponds to the particular computing resource being in a particular health state;
diagnosing the performance degradation includes, for each measurement of at least a plurality of the obtained measurements, determining a probability of being in the particular health state given a predetermined range, from a plurality of predetermined ranges, into which the measurement falls.

14. A system, comprising: one or more processors; and memory including executable instructions that, when executed by the one or more processors, cause the system to implement at least: an interface configured to receive a query that specifies measurements for a computing resource, the measurements comprising a measurement for each of a plurality of processes involved in operation of a data storage volume; and a query engine configured to: use the measurements to determine, based at least in part on previously obtained measurements for the processes, a response to the query, the response including a probability model generated based at least in part on the previously obtained measurements; and provide the determined response, wherein the determined response includes information indicating one or more potential causes of a performance degradation of the data storage volume.

15. The system of claim 14, wherein the system corresponds to a computing resource provider that provides use of the computing resource the system provides the interface to customers of the computing resource provider.

16. The system of claim 14, wherein the measurement for the data storage volume include at least one measurement that involves two separate device separated by a network.

17. The system of claim 14, wherein: operation of the data storage volume involves communication with a computing resource; at least a subset of the processes are part of the communication; and one or more measurements of the processes that are part of the communication are timing measurements.

18. The system of claim 14, wherein using the measurements based at least in part on the previously obtained measurements for the processes includes using a contingency table generated based at least in part on the previously obtained measurements.

19. The system of claim 14, wherein the previously obtained measurements are from a fleet of computing resources of a same type as the data storage volume.

20. The system of claim 14, wherein the query specifies a health state of the computing resource from a plurality of predetermined health states.

21. One or more non-transitory computer-readable storage media having collectively stored thereon instructions that, when executed by one or more processors of a computer system, cause the computer system to: obtain measurements of processes involved in the operation of a fleet of data storage volumes; generate, based at least in part on the obtained measurements, a probability model that, for each process of at least a plurality of the processes, is usable to obtain probabilities as a function of at least a data storage volume health state and a measurement of the process; use the generated probability model to provide information about data storage volumes; and wherein the generated probability model includes information indicating one or more potential causes of a performance degradation of the data storage volume.

22. The one or more non-transitory computer-readable storage media of claim 21, wherein the probability model is a representation of conditional probabilities that is usable to determine a probability of being in a particular health state given a measurement of a process of the processes.

23. The one or more non-transitory computer-readable storage media of claim 21, wherein using the generated probability model to provide information includes: receiving a query that specifies a health state of a particular data storage volume and plurality of measurements comprising a measurement for each of a plurality of processes involved in the particular data storage volume's operation; using the probability module to determine one or more potential causes of the health state for the particular data storage volume; and providing information that is indicative of at least one of the determined one or more potential causes.

24. The one or more non-transitory computer-readable storage media of claim 21, wherein:
the computing resources include storage volumes logically attached to respective computer system instances; and
at least some of the processes are part of the computer system instances communicating with the storage volumes to perform input/output operations.

25. The one or more non-transitory computer-readable storage media of claim 21, wherein the obtained measurements include at least one of communication latencies or operational latencies.

* * * * *